United States Patent
Bharucha et al.

(10) Patent No.: US 10,101,157 B2
(45) Date of Patent: Oct. 16, 2018

(54) FREE-SPACE FORCE FEEDBACK SYSTEM

(71) Applicants: Eric Bharucha, St-Augustin (CA);
Simon Tremblay, Quebec (CA)

(72) Inventors: Eric Bharucha, St-Augustin (CA);
Simon Tremblay, Quebec (CA)

( * ) Notice: Subject to any disclaimer, the term of this patent is extended or adjusted under 35 U.S.C. 154(b) by 305 days.

(21) Appl. No.: 14/853,137

(22) Filed: Sep. 14, 2015

(65) Prior Publication Data

US 2017/0074898 A1    Mar. 16, 2017

(51) Int. Cl.
*G01C 19/02* (2006.01)
*G06F 3/01* (2006.01)

(52) U.S. Cl.
CPC ............ *G01C 19/02* (2013.01); *G06F 3/016* (2013.01)

(58) Field of Classification Search
CPC ................................. G01C 19/02; G06F 3/016
USPC ........................................................ 73/503.3
See application file for complete search history.

(56) References Cited

U.S. PATENT DOCUMENTS

| | | | |
|---|---|---|---|
| 5,024,112 A * | 6/1991 | Kidd | F03G 3/08 74/5.37 |
| 5,589,828 A | 12/1996 | Armstrong | |
| 5,617,515 A | 4/1997 | MacLaren et al. | |
| 5,629,594 A | 5/1997 | Jacobus et al. | |
| 5,754,023 A * | 5/1998 | Roston | B25J 9/1689 318/561 |
| 6,126,373 A | 10/2000 | Yee et al. | |
| 6,154,198 A | 11/2000 | Rosenberg | |
| 6,162,123 A | 12/2000 | Woolston | |
| 6,198,471 B1 | 3/2001 | Cook | |
| 6,573,885 B1 | 6/2003 | McVicar | |
| 6,985,133 B1 | 1/2006 | Rodomista et al. | |
| 8,169,406 B2 | 5/2012 | Barney et al. | |
| 2001/0000663 A1 | 5/2001 | Shahoian et al. | |
| 2001/0034257 A1 | 10/2001 | Weston et al. | |
| 2004/0259688 A1 | 12/2004 | Stabile | |
| 2005/0073496 A1 | 4/2005 | Moore et al. | |
| 2007/0242042 A1 | 10/2007 | Kelly | |
| 2009/0207250 A1 * | 8/2009 | Bennett | F16M 11/105 348/144 |
| 2010/0009754 A1 | 1/2010 | Shimamura et al. | |
| 2010/0261526 A1 | 10/2010 | Anderson et al. | |
| 2010/0304868 A1 | 12/2010 | Zalewski | |
| 2013/0029764 A1 | 1/2013 | Wang | |

* cited by examiner

*Primary Examiner* — Son Le
*Assistant Examiner* — Tarun Sinha
(74) *Attorney, Agent, or Firm* — Dunlap Bennett & Ludwig, PLLC

(57) ABSTRACT

A free-space force feedback system that can be mounted to an input/output device so as to enable its operator complete ambulatory movement is provided. The input/output device may determine operator position, motion and torque (input) so that said device can interactively impart a command torque vector force (output) so as to provide from one to six degrees of freedom and highly realistic force feedback to an operator of the input/output device. The force feedback may be imparted by at least one orthogonally oriented MACSD (Multiple Axis Counter Spinning Disk), wherein MACSD may be mounted to the input/output device, thereby coupling reaction forces to the operator so that only the desired forces (command torque vectors) are felt without the need for connection to a fixed frame.

8 Claims, 4 Drawing Sheets

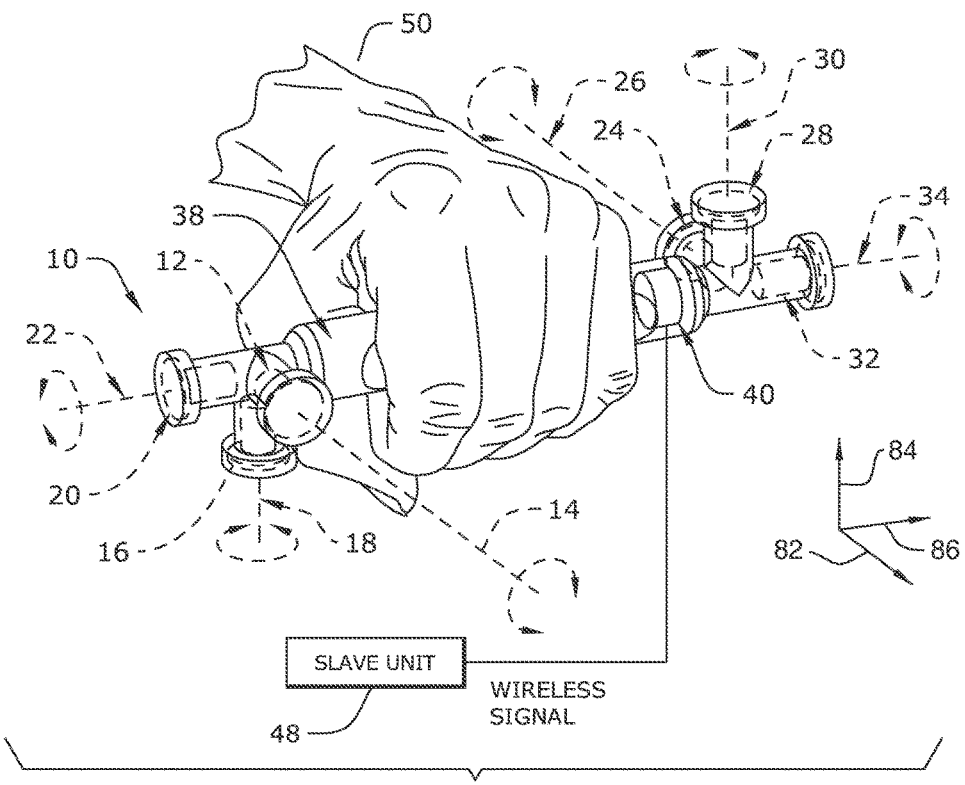
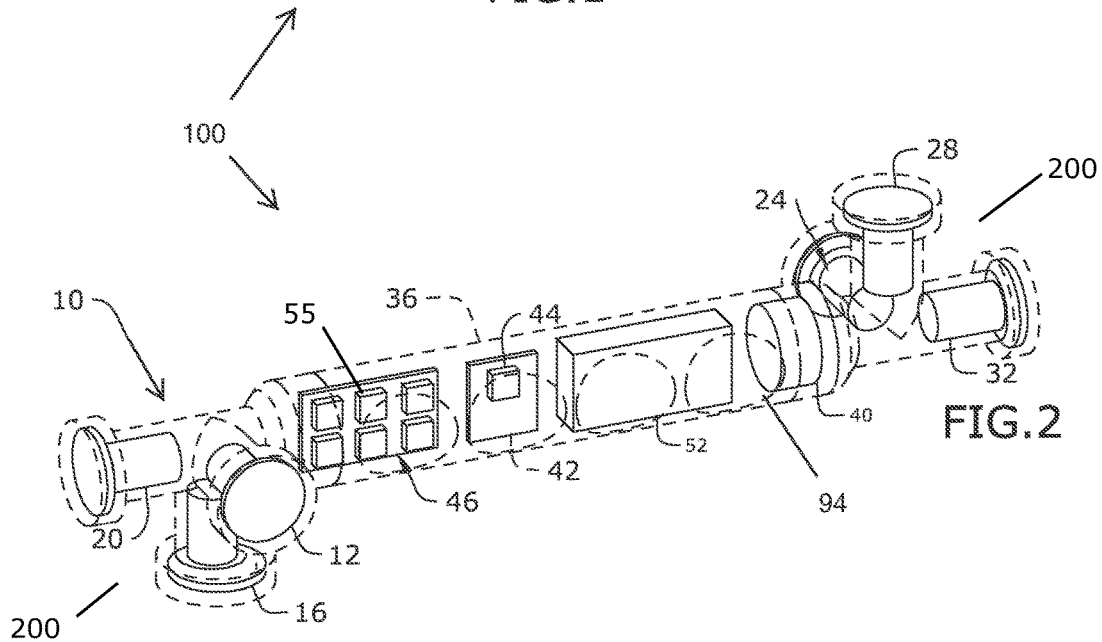

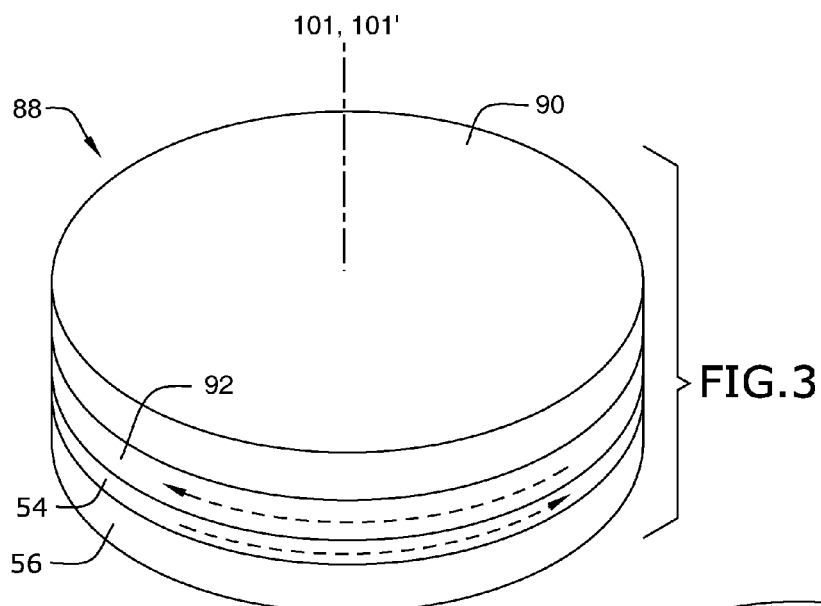
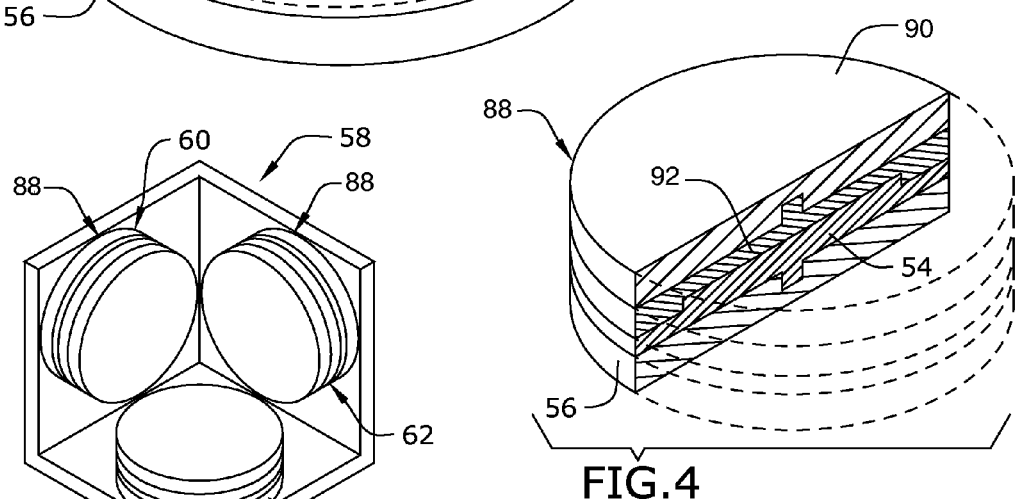
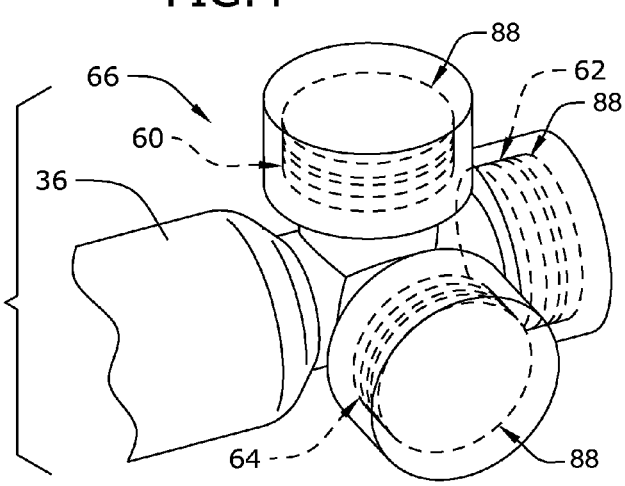

FREE-SPACE FORCE FEEDBACK SYSTEM

BACKGROUND OF THE INVENTION

The present invention relates to feedback systems and, more particularly, to a free-space force feedback system that can be mounted to an input/output device so as to enable its operator complete ambulatory movement while sensing operator position, motion and torque (input) so that said device can interactively impart a command torque vector force (output).

In a virtual reality system or augmented reality setup, current force feedback devices are bulky and must be anchored support (e.g., set on a table or a stand) or other static surface to impart a force. For example when using a video game joystick, such mechanical feedback devices confine the user to static surfaces needed to push against.

Free space devices as seen in some video game consoles can only generate a vibratory feedback response and audio and/or visual cues, i.e. a "replacement sensation" vibration instead of a realistic force, resulting in poor emulation of reality within virtual or augmented reality environments.

As can be seen, there is a need for a free-space force feedback system that can be mounted to an input/output device so as to enable its operator complete ambulatory movement while operator position, motion and torque (input) so that said device can interactively impart a command torque vector force (output).

SUMMARY OF THE INVENTION

In one aspect of the present invention, multi-axis counter spinning device for a free-space force feedback system includes at least one pair of counter spinning masses, each pair of spinning masses comprising a first counter spinning mass and a second counter spinning mass sharing an axis of rotation; and a drive unit rotatably connected to each counter spinning mass, each drive unit adapted to independently rotate each pair of counter spinning masses in at least opposing directions, wherein each pair of counter spinning masses is orthogonally disposed from each other, whereby a continued torque may be imparted about the axis of rotation.

In another aspect of the present invention, an input/output device for a free-space force feedback system utilizing the multi-axis counter spinning devices includes a body having a longitudinal axis; a first multi-axis counter spinning device disposed on one end of the body; and a second multi-axis counter spinning device disposed on another opposing end of the body.

In yet another aspect of the present invention, an input/output device for a free-space force feedback system utilizing the multi-axis counter spinning devices includes a body having a longitudinal axis; a first multi-axis counter spinning device disposed on one end of the body; a second multi-axis counter spinning device disposed on another opposing end of the body, wherein the second multi-axis counter spinning device is rotated 180 degrees about the longitudinal axis relative to the first multi-axis counter spinning device; a solid state inertial sensor disposed on the body, wherein the solid state inertial sensor is adapted to sense the current position of the input/output device; a slave device adapted to determine a magnitude and orientation of a command torque vector to be applied to the input/output device; a control circuitry configured to convert command torques from the slave device into torque forces imparted by the opposing multi-axis counter spinning devices; and a navigation system disposed on the body, wherein the navigation system is adapted to sense a special location, a speed and an acceleration of the input/output device.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention, shown in use;

FIG. 2 is a perspective view of an exemplary embodiment of the present invention, with some portions shown in hidden lines for illustrative clarity of internal components;

FIG. 3 is a perspective view of an exemplary embodiment of the present invention;

FIG. 4 is a cutaway perspective view of an exemplary embodiment of the present invention;

FIG. 5 is a perspective view of an exemplary embodiment of the present invention;

FIG. 6 is a perspective detail view of an exemplary embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a free-space force feedback system that can be mounted to an input/output device so as to enable its operator complete ambulatory movement. The input/output device may determine operator position, motion and torque (input) so that said device can interactively impart a command torque vector force (output). The present invention provides an input/output device and method a method of using the same so as to provide from one to six degrees of freedom and highly realistic force feedback to an operator of the input/output device. In one embodiment, one or more orthogonally oriented MACSD (Multiple Axis Counter Spinning Disk) may be mounted to the input/output device, thereby coupling reaction forces to the operator so that only the desired forces (command torque vectors) are felt without the need for connection to a fixed frame.

Figure 7:
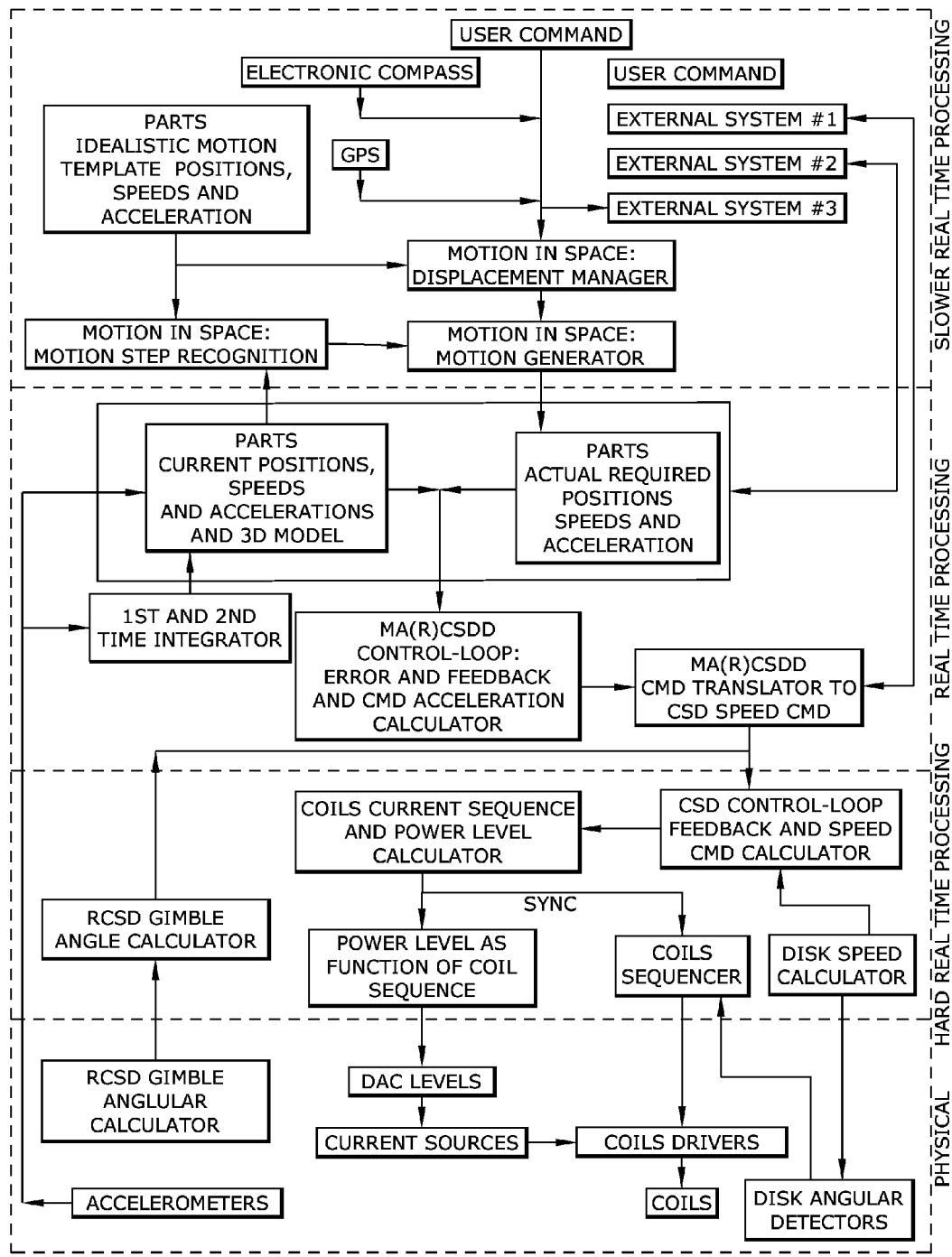
FIG. 7 is a schematic view of an exemplary embodiment of the present invention.
Figure 8:
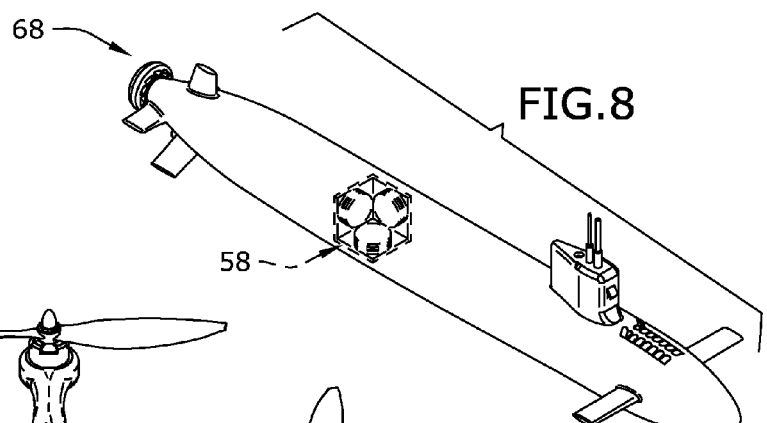
FIG. 8 is a perspective view of an exemplary embodiment of the present invention.
Figure 9:
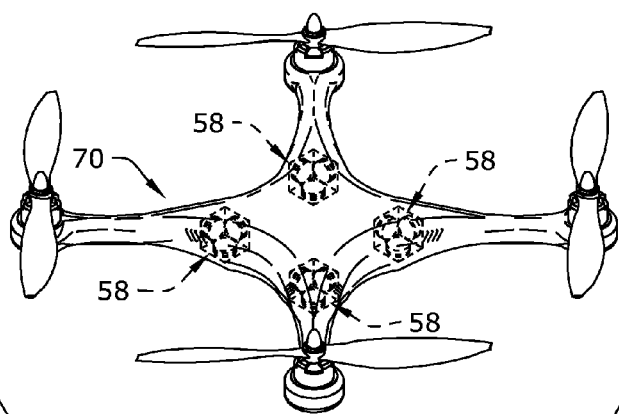
FIG. 9 is a perspective view of an exemplary embodiment of the present invention.
Figure 10:
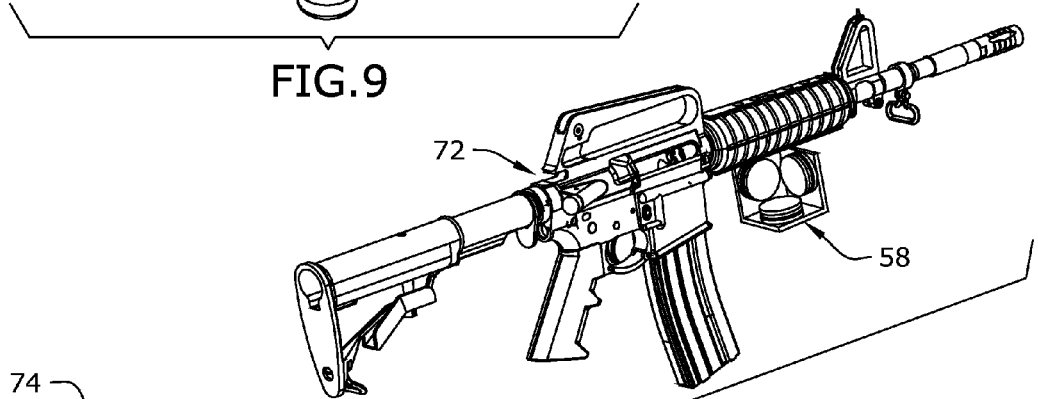
FIG. 10 is a perspective view of an exemplary embodiment of the present invention.
Figure 11:
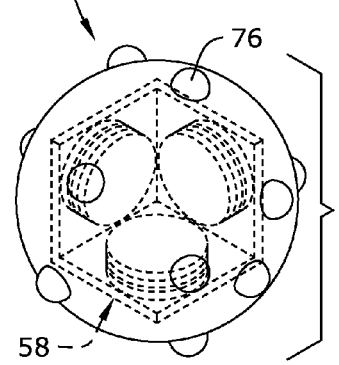
FIG. 11 is a perspective view of an embodiment of the present invention.

Referring to FIGS. 1 through 11, the present invention may include a free-space force feedback system 100 embodying a method of mounting at least one inertial manifold 88 to an input/output device. The input/output device may include but not be limited to a gyro wand 38, as illustrated in FIGS. 1, 2 and 6, a submarine 68, a drone 70, a weapon 72, a space exploration robot 74 with external bumps 76, as illustrated in FIGS. 8 through 11. Each such input/output device may have a body, such as the casing 36 of the gyro wand.

Each inertial manifold 88 may include at least one pair of counter spinning masses: a first mass 54 and a second mass 92, each independently and rotatably connected to first and second drive units, 56 and 90, respectively, as illustrated in FIG. 4. Alternatively, a single motor could drive both spinning masses 54, 92. Each drive unit 56, 90 can be asynchronous bearing mounted brushless motors or the like, magnetic field generators (wherein the masses are magnetic objects), air and/or fluid propulsion devices and the like. In certain embodiments, the mass 54, 92 may substituted for weighted discs, magnetic object, plasma, fluid gas or liquid, compressed air, coherent spinning atoms or the like.

The first and second masses 54 and 92 may be adapted to independently rotate about a shared rotational axis 101 in opposing direction so that they may accelerate disproportionally as well as inversely relative to each other. The shared rotational axis 101 may be synonymous with a center of mass 101' of the inertial manifold 88, thereby enabling a controlled impartation of continued torque about said center of mass 101'. In certain embodiments, compressed air or other propellants with control valves or motorized propellers could be used instead of the gyros. Magnetic or electric fields could also be used to impart motion on the device.

Generating forces using an inertial manifold requires modulation of angular momentum or angular acceleration that will result in forces. This in turn necessitates sophisticated electronic controls. We have that:

$$\vec{L} = I \cdot \bar{\omega}$$

We also have $$\vec{\tau} = \vec{I} \cdot \alpha = \frac{d\vec{L}}{dt}$$

The above equation implied that changes in angular momentum ($\vec{L}$) will impart a torque ($\vec{\tau}$) about the systems center of mass thus.

To obtain a force from an inertial manifold 88, the first mass 54 may be accelerated to a maximum point at which it begins decelerating. Simultaneously its counterpart mass 92 begins to spin such that it generates a torque in the opposite direction about a center of mass, thus imparting a continued torque about this same center of mass. Simultaneously, the first mass 54 begins to slow down and may be decelerated with a third disk to prevent generation of counter opposing forces. Each mass pair 54, 92 has a finite time to runaway that it can handle.

In certain embodiments, three inertial manifolds 88 may be coupled so that each shared rotational axis is orthogonally oriented, forming a multi axis counters spinning device (MACSD) 200. The MACSD may be formed by coupling each inertial manifold 88 along orthogonally oriented surfaces in a wall configuration 58, as illustrated in FIG. 5. Said wall configurations may be disposed in or on the various input/output devices illustrated in FIGS. 8 through 11.

Multiple mass systems (MACSD) can be used to sequentially apply force to runaway and then be rested to extinction time while other groups continue to generate force. Multiple MACSD can have a cumulative, amplifying effect and a counterbalance, balancing effect.

In alternative embodiments, the three inertial manifolds 88 may form a branch configuration 66, as illustrated in FIG. 6, or a distended configuration 10, as illustrated in FIGS. 1 and 2. Each branch configurations 66, 10 may be disposed on opposing ends of various gyro wands 38. This opposing arrangement may be one of many MACSD network arrangements that a plurality of MACSD may be arranged in. The branch configuration in FIG. 6 illustrates orthogonally oriented x-axis inertial manifold 62, y-axis inertial manifold 60 and z-axis inertial manifold 64.

In FIG. 1, the opposing arrangement may include a first-x inertial manifold 12 adapted to rotate about a first x-axis 14; a first-y inertial manifold 16 adapted to rotate about a first y-axis 18; and a first-z inertial manifold 20 adapted to rotate about a first z-axis 22 disposed on the distended branch configuration 10 on a first end of the gyro wand 38. The opposing arrangement of FIG. 1 may further include a second-x inertial manifold 24 adapted to rotate about a second x-axis 26; a second-y inertial manifold 28 adapted to rotate about a second y-axis 30; and a second-z inertial manifold 32 adapted to rotate about a second z-axis 34 disposed on the distended branch configuration 10 on an opposing second end of the gyro wand 38. In other words, a second multi-axis counter spinning device disposed on another opposing end of the body, wherein the second multi-axis counter spinning device is rotated 180 degrees about the longitudinal axis (equivalent to 34 for the elongated body/casing 36 of the gyro wand 38 in FIG. 1) relative to the first multi-axis counter spinning device.

The gyro wand 38 may also include a power source 52, a wireless communicator 40, a solid state inertial sensor 44, drive electronics 46, and a slave device 48 all electronically connected to a control circuitry 42. The power source 52 may be a battery or the like. In certain embodiments, power could be sent remotely via a cable or wirelessly thus removing the need for batteries. The slave device 48 may include at least one processing unit with a form of memory such as a microprocessor or computer. The solid state inertial sensor 44 may include a plurality of accelerometers and or solid-state gyros adapted to detect and distinguish the six freedoms of movement, linear motion along the X, Y, and Z axes, and rotations about those axes. The solid state inertial sensor 44 may be adapted to sense the current position of the input/output device and determining the difference between the current position and a previous position of the input/output device. In certain embodiments, the present invention could use optical means like cameras, infrared, ultrasonic or radio waves to detect the position of the device instead of using inertial sensors.

The slave device 48 may be adapted to determine a magnitude and orientation of a command torque vector to be applied to the input/output device; wherein the magnitude is based at least in part on the difference between the current position and the previous position. The input/output device used in conjunction with the slave device 48 for monitoring operator manipulations and for enabling responsive command torque vectors facilitation forceful sensations in response to the manipulations.

Such components may be housed in a casing 36 dimensioned and adapted to be manually controlled by an operator 50; for example, forming a cylindrical shape. Though, the casing 36 may form any shape so long as the gyro wand 38 functions in accordance with the present invention as described herein. In certain embodiment, the casing 36 may form a plurality of spaced-apart indentations 94 along its length for facilitating a reliable grip.

The present invention may modulate angular momentum so it can apply forces without such fixture points. Each input/output device may have its own navigation system 55 so that it senses its spatial location, speed and acceleration. When the operator 50 moves the gyro wand 38, it can react by applying opposing forces to the imparted motion. To achieve this the solid state inertial sensor 44 may send a signal to the slave device 48 when the gyro wand 38 is moved. In turn the host and processor together generate the appropriate angular vector command such that the combinations of the MACSD are actuated creating the target forces.

Physical logic gates are present in the control circuitry 42 may implement subroutines to convert motion feedback commands coming from the slave device 48 into a torque force.

To achieve this first the angular momentum required to generate this force is calculated. The force vector also has a direction and the appropriate MACSD must be selected to create the combined angular moment vector that generates this force. In turn, the angular momentum can be modulated by speeding up or slowing down the motor and this is achieved by changing the current (amplitude and/or phase) running through the motor. Angular acceleration is proportional to the torqing force when multiplied by the angular momentum.

A method of using the present invention may include the following. The free-space force feedback system 100 disclosed above may be provided. The free-space force feedback system 100 may impart forces in any axis. Functionally it is a "floating" force feedback input/output device but actually much more. If pushed against the input/output device, the input/output device may be programmed to push back or react in any direction. In a virtual reality setting the input/output device can mimic the interaction of any object with inertia like a baseball bat, a hockey stick, a tennis racket or a sword a cane a walking stick, a golf club a branch a barbell, the stick of a jet or a steering wheel, or anything else for that matter. A dynamic weight of the input/output device can be temporarily modulated so that it can feel light one moment or heavy the next. The forces the input/output device imparts can push gently and softly one instant and push hard the next it can create artificial but lifelike sensation and reactions mimicking the manipulation of virtually any object in free space it does this by modulating it's instantaneous angular momentum vector on one or many axis and generating artificial feedback.

One physical realization of the free-space force feedback system 100 may include a plurality of orthogonal oriented MACSD in an opposing arrangement on opposing ends of a gyro wand 38. Taking the gyro wand 38 in hand, the operator 50 may simply interact with the virtual reality environment pretending the gyro wand 38 is the virtual device. In augmented reality the opposing arrangement of the plurality of orthogonal oriented MACSDs can be mounted to another object or body part to "guide" the object. Multiple gyro wands 38 of various sizes could be attached to a suit to make an exomuscular suit which could increase force of limbs yet maintain complete joint motion, adding finesse and control for short burst like impulse forces.

Additionally: It can be used for playing video games, but also for training. In many fields, such as aviation and vehicle and systems operation, virtual reality systems have been used successfully to allow a user to learn from and experience a realistic "virtual" environment. The present invention can be used for training at sports. Surgery, flying a rocket, learning the violin can all be practiced using such a device or a combination of them.

Also, it can create trainer devices and adaptive suits, such as full body suits with freely moving joints for training. These could be made using the network arrangement of the plurality of orthogonal oriented MACSD. Guide devices could be derived. For example attached to a gun the MACSD could serve as a target aid by providing an inertia base to improve aiming and also by making final corrections to the target by moving the gun automatically. It could be used to guide the insertion of a surgical probe by moving the probe along a predetermined course correcting surgeon error as it is moved.

In augmented reality settings, the device can help stabilize the movements of an operator or suggest through sensations the preferred (default) contextual movements for a delicate task or when manipulating sensitive equipment like a surgical tool, remotely piloting a drone or aiming a weapon.

It should be understood, of course, that the foregoing relates to exemplary embodiments of the invention and that modifications may be made without departing from the spirit and scope of the invention as set forth in the following claims.

What is claimed is:

1. An input/output device for a free-space force feedback system, comprising:
    a plurality of multi-axis counter spinning devices, each multi-axis counter spinning device comprising:
        three pairs of counter spinning masses, each pair of spinning masses sharing an axis of rotation, wherein each pair of counter spinning masses is orthogonally disposed from each other;
        a drive unit rotatably connected to each counter spinning mass, each drive unit adapted to independently rotate each pair of counter spinning masses in at least opposing directions;
    a body having a longitudinal axis;
    a first multi-axis counter spinning device disposed on one end of the body; and
    a second multi-axis counter spinning device disposed on another opposing end of the body,
    whereby the three pairs of counter spinning masses provide from one to six degrees of freedom when imparting a continued torque about the axis of rotation.

2. The multi-axis counter spinning device of claim 1, wherein each pair of counter spinning masses is disposed along orthogonally oriented surface,
    whereby forming a wall configuration of the multi-axis counter spinning device.

3. The input/output device of claim 1, wherein the second multi-axis counter spinning device is rotated 180 degrees about the longitudinal axis relative to the first multi-axis counter spinning device.

4. The input/output device of claim 1, further comprising a solid state inertial sensor disposed on the body, wherein the solid state inertial sensor is adapted to sense the current position of the input/output device.

5. The input/output device of claim 1, further comprising a slave device adapted to determine a magnitude and orientation of a command torque vector to be applied to the input/output device.

6. The input/output device of claim 5, further comprising a control circuitry configured to convert command torques from the slave device into torque forces imparted by the opposing multi-axis counter spinning devices.

7. The input/output device of claim 1, further comprising a navigation system disposed on the body, wherein the navigation system is adapted to sense a special location, a speed and an acceleration of the input/output device.

8. An input/output device for a free-space force feedback system, comprising:

a plurality of multi-axis counter spinning devices, each multi-axis counter spinning device comprising:
   three pairs of counter spinning masses, each pair of spinning masses sharing an axis of rotation, wherein each pair of counter spinning masses is orthogonally disposed from each other;
   a drive unit rotatably connected to each counter spinning mass, each drive unit adapted to independently rotate each pair of counter spinning masses in at least opposing directions;
a body having a longitudinal axis;
a first multi-axis counter spinning device disposed on one end of the body;
a second multi-axis counter spinning device disposed on another opposing end of the body, wherein the second multi-axis counter spinning device is rotated 180 degrees about the longitudinal axis relative to the first multi-axis counter spinning device;
a solid state inertial sensor disposed on the body, wherein the solid state inertial sensor is adapted to sense the current position of the input/output device;
a slave device adapted to determine a magnitude and orientation of a command torque vector to be applied to the input/output device;
a control circuitry configured to convert command torques from the slave device into torque forces imparted by the opposing multi-axis counter spinning devices; and
a navigation system disposed on the body, wherein the navigation system is adapted to sense a special location, a speed and an acceleration of the input/output device.

* * * * *